(No Model.)
L. E. WHITON.
SPEED CHANGING MECHANISM FOR LATHES.
No. 437,067. Patented Sept. 23, 1890.
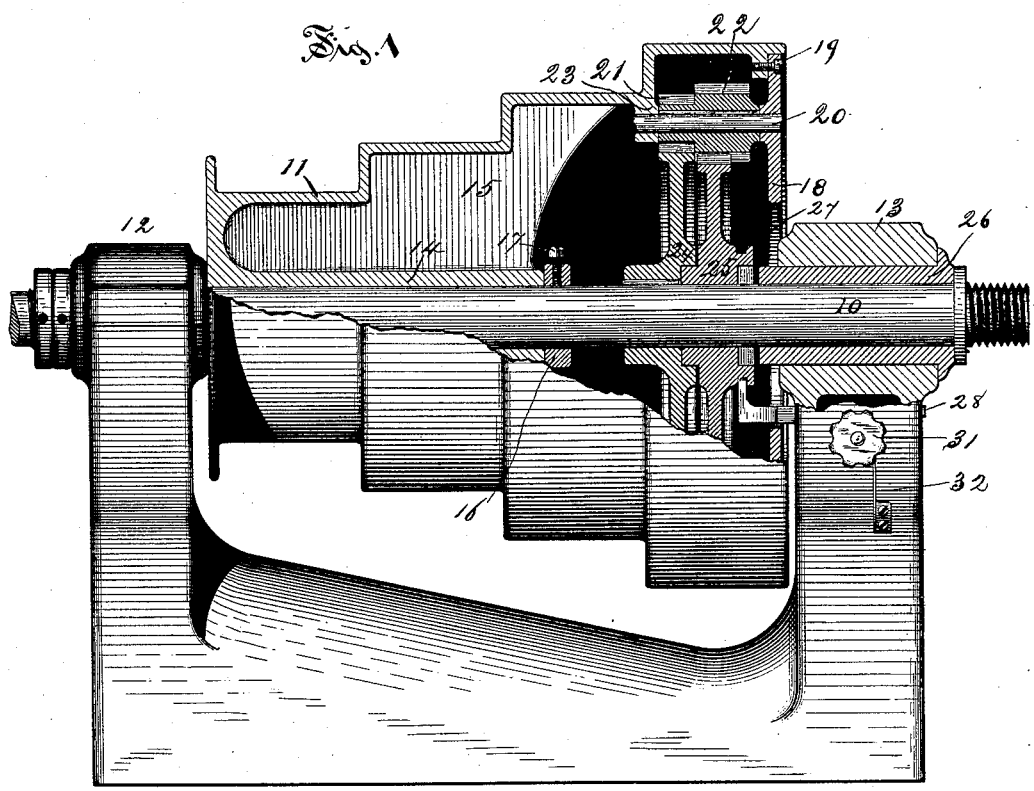
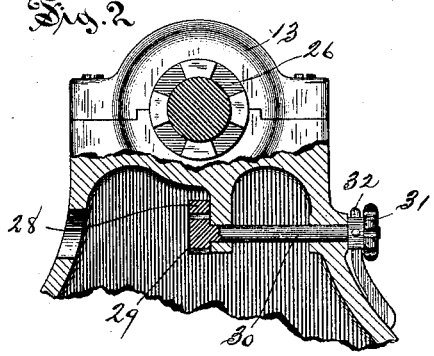
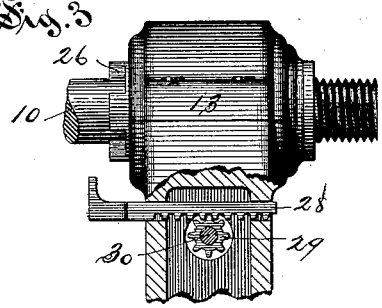
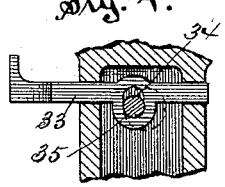
Witnesses:
W. M. Bjorkman
Henry A. Kingsbury
Inventor:
Lucius E. Whiton
By his Attorney,
Frank H. Allen.

UNITED STATES PATENT OFFICE.

LUCIUS E. WHITON, OF NEW LONDON, CONNECTICUT.

SPEED-CHANGING MECHANISM FOR LATHES.

SPECIFICATION forming part of Letters Patent No. 437,067, dated September 23, 1890.

Application filed September 19, 1889. Serial No. 324,459. (No model.)

*To all whom it may concern:*

Be it known that I, LUCIUS E. WHITON, a citizen of the United States, residing in the city and county of New London, and State of Connecticut, have invented certain new and useful Improvements in Speed-Changing Mechanism for Lathes, which improvements are fully set forth and described in the following specification, reference being made to the accompanying sheet of drawings, in which—

Figure 1 is a side elevation of a mechanism embodying and illustrating my invention, the same being broken away in part to expose the internal elements. Fig. 2 is an inner end view of the journal-bearing 13, partially cut away to show a rack-and-pinion mechanism, hereinafter described. Fig. 3 is a front side view of said journal-bearing broken away, and Fig. 4 is a similar view of a modification or equivalent of said rack-and-pinion shifting mechanism.

This invention is in the class of mechanisms commonly known as "fast and slow gearing," and has for its object the production of a simple mechanism that may be utilized with advantage in lathe-heads, drill-presses, and analogous machines in which variable speed is desired. A further feature of my said invention lies in a novel arrangement of clutches and operating devices by means of which the speed may be changed from fast to slow or from slow to fast without stopping the main pulley of the complete mechanism.

I have here illustrated my said invention as applied to a lathe-head, the reference-figure 10 indicating the spindle, and 11 a cone-pulley loosely fitted thereon. Spindle 10 is journaled in bearings 12 13. Pulley 11 is cast with a central shell 14, that forms a bearing of considerable length, said shell being connected with the circumference of the pulley by a series of radial ribs 15. To prevent endwise displacement of the pulley on the spindle, a collar 16, secured to the spindle 10 by a set-screw 17, may be used, or the central shell 14 of the pulley may be elongated sufficiently to abut against the hub of the gear 24, hereinafter described. The larger (open) end of pulley 11 is closed by a circular plate 18, that is secured in place by screws 19, and provides a bearing near the perimeter of the pulley for one end of a shaft 20, that carries two pinion-gears 21 22. The opposite end of shaft 20 is journaled in a lug-bearing 23, cast on or secured to the cone-pulley. These pinions 21 22 are of different diameters, are fastened firmly together or formed integral, and are journaled upon shaft 20 and carried around by pulley 11 as said pulley rotates.

24 denotes a gear that is keyed or otherwise fixed on spindle 10 and meshes with pinion-gear 21. 25 denotes a similar gear of smaller diameter that meshes with the pinion-gear 22, and is loosely fitted on said spindle. Said gear 25 may be moved longitudinally, but is always in mesh with its companion gear 22 the latter being of unusual length, as will be seen by reference to the drawings. The two opposite ends of the hub of gear 25 are formed as clutches, that on one end being adapted for interlocking with the correspondingly-shaped hub of gear 24 and that on the opposite end for interlocking with the end of a fixed thimble 26 within the bearing or box 13. These clutches may be friction-clutches of any practical form or may be simply projecting lugs, as here illustrated, said lugs being capable of interlocking with each other when gear 25 is moved longituinally on the spindle 10, as above described. The inner or fixed gear 24 is larger than the loose gear 25, and the pinions 21 22, that complete the train, are correspondingly formed.

When the loose gear 25 is forced inward and interlocked with gear 24, as in Fig. 1, it will be obvious that no correlative rotary motion can occur in the described train of gearing, and that the cone-pulley 11 will become as a fast pulley on spindle 10, and said pulley and spindle will rotate together at the same speed; but when gear 25 is moved outward and its clutch is so interlocked with the thimble 26 that the rotation of said gear is prevented, then the rotation of the cone transmits motion through the described train of gearing to spindle 10, which is thereby caused to revolve in the same direction as the cone, but at a slower speed.

The outer end of the hub of gear 25 is formed with a circumferential groove 27.

Within the head-block, immediately beneath the bearing 13, is a toothed rack 28, whose inner end projects within the cone-pulley and upward into the circumferential groove 27. This rack 28 is actuated by a pinion-gear 29 on a shaft 30, journaled in the head-block, the exposed end of said shaft being provided with an operating-lever handle or with a hand-wheel 31, as here shown. In place of this toothed rack 28 it may sometimes be advantageous to substitute a sliding plate 33, having a transverse slot 34, and in place of the pinion 29 an eccentric 35, as shown in Fig. 4, these means of moving gear 25 being regarded as equivalents. It is obvious, also, that other equivalent mechanisms for moving gear 25 may be used within the scope of my invention, those mentioned being intended as types of a variety of convenient devices of this kind well known to those skilled in the art to which my invention appertains.

The inner end or hub of hand-wheel 31 may be squared and a flat spring 32 provided, whose free end may bear against said hub to prevent the accidental rotation of shaft 30.

When it is desired to move gear 25 to connect it with gear 24, the hand-wheel 31 is grasped and partially rotated to the left hand, as arranged in Fig. 1, this motion being sufficient to slide rack 28 and its connected gear. When, on the other hand, it is desired to move gear 25 outward to slow down the spindle, the hand-wheel is rotated toward the right hand.

When applied to a lathe-head, as here illustrated, the described changes may be made, if desired, without stopping the cone-pulley, thus avoiding the annoyance experienced with back-geared lathe-heads of ordinary construction.

My device as a whole furnishes mechanism that is symmetrical in appearance, and which is simple and strong in its parts and positive in its action.

Having described my invention, I claim—

1. In combination with a spindle suitably journaled, a pulley loosely fitted thereon having connected pinion-gears 21 22, journaled near its perimeter and adapted to be carried around with said pulley, as set forth, a gear fixed on said spindle in mesh with the smaller of said pinions 21 and having its hub formed with a clutch-surface, a loose gear on said spindle in mesh with the larger pinion 22, having both ends of its hub formed with clutch-surfaces, a fixed journal-bearing for said spindle having a clutch-surface coincident with that on the outer end of said loose gear, and shifting mechanism, substantially as described, for moving said loose gear longitudinally on said spindle for engaging and disengaging said clutch-surfaces.

2. In combination with a spindle suitably journaled, a pulley loosely fitted thereon, a train of gearing within said pulley, as hereinafter set forth, for varying the speed of said spindle, the hub of the loose gear 25 of the train being formed with a circumferential groove, a shifting-bar parallel with said spindle having an arm projecting into said groove, and an operating member connected to said shifting-bar and provided with a suitable handle, all being substantially as and for the purpose specified.

3. In combination with a spindle suitably journaled, a pulley loosely fitted thereon having a bearing-shell throughout a portion of its length, means, substantially as described, to prevent endwise movement of the pulley, connected pinion-gears 21 22, journaled within said pulley near its perimeter, the inner pinion 21 being the smaller and the outer pinion 22 being of unusual length, as and for the purpose stated, a gear 24, fixed on said spindle in mesh with the smaller pinion, a gear of less diameter loosely fitted on said spindle in mesh with the larger pinion, clutch-surfaces, substantially as described, for locking said loose gear to said fixed gear or to the rigid head-block, and shifting mechanism consisting of a circumferential groove in the hub of the loose gear, a shifting-bar parallel to the spindle having an arm projecting into said circumferential groove, and an operating member connected to said shifting-bar for moving said loose gear longitudinally on said spindle, all substantially as and for the purpose set forth.

LUCIUS E. WHITON.

Witnesses:
D. E. WHITON,
A. M. LUTHER.